July 14, 1931.  J. MOSLEH  1,814,841
MAGNETIC BRAKE FOR TRAINS
Filed April 17, 1930
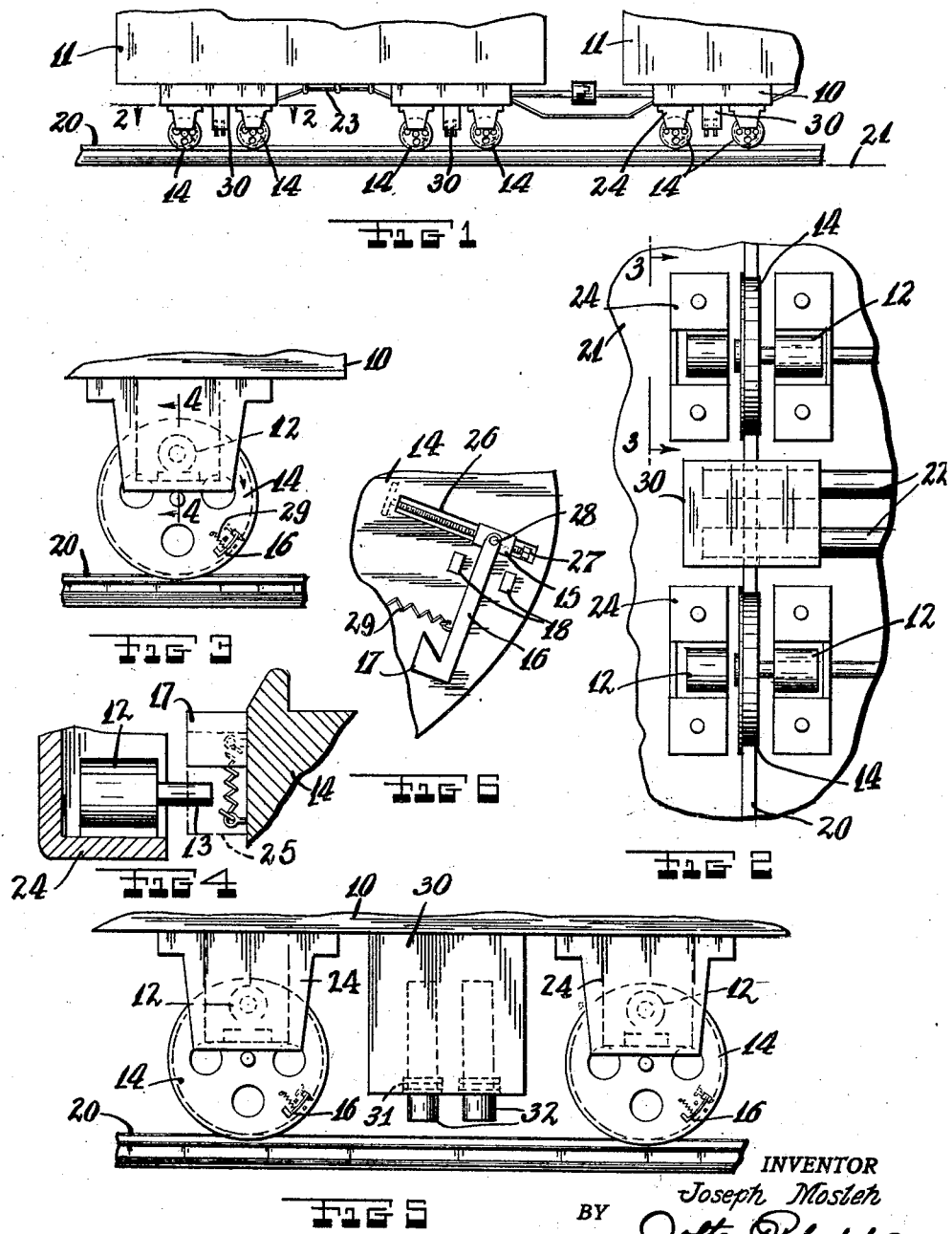
INVENTOR
Joseph Mosleh
BY
ATTORNEY Patented July 14, 1931

1,814,841

UNITED STATES PATENT OFFICE

JOSEPH MOSLEH, OF BROOKLYN, NEW YORK

MAGNETIC BRAKE FOR TRAINS

Application filed April 17, 1930. Serial No. 444,984.

This invention relates to new and useful improvements in a magnetic brake for trains.

The invention has for an object the provision of a device of the class mentioned which is of simple durable construction, dependable in use and efficient in action, and which can be manufactured and sold at a reasonable cost.

The invention proposes a means to stop the rotation of the wheels of a train so as to bring the train to a fast stop. It is proposed that said means be electrically operated so as to provide unitary operation on all of the wheels simultaneously. In an emergency an arrangement of this type is a great asset in that it brings the train to a quick and sure stop. The electrically operated means should preferably include the use of electromagnets.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a side elevational view of a portion of a train resting upon tracks.

Fig. 2 is a fragmentary enlarged horizontal sectional view taken on the line 2—2 of Fig. 1.

Fig. 3 is a fragmentary enlarged elevational view of one of the wheels seen as though looking in the direction 3—3 of Fig. 2.

Fig. 4 is a fragmentary enlarged sectional view taken on the line 4—4 of Fig. 3.

Fig. 5 is an enlarged side elevational view of one of the trucks.

Fig. 6 is an enlarged detailed view of a portion of Fig. 3.

The magnetic brake for trains is used upon trucks 10 mounted upon the cars 11 of a train. Each of the magnetic brakes consists of solenoid 12 supported on the truck 10 and provided with plunger 13 extendible towards the side of a wheel such as 14 on said truck 10, a block 15 radially adjustable on said wheel 14, an arm 16 pivoted on said block 15 and formed with an offset front end 17 for engaging against said plunger 13 when extended, stops 18 on the wheel 14 on opposite sides of said arm 16, resilient means for drawing said arm inwards upon slowing down of turning of said wheel which reduces the centrifugal force so that said offset front end 17 engages said extended plunger 13 to stop said wheel, and said block 15 being adjustable for positioning said arm so that all shock due to said stoppage is carried by the pintle of said arm or distributed between the pintle and one of said lugs.

In Fig. 1 a portion of a train has been illustrated which consists of the said cars 11 coupled together. This train is shown mounted upon tracks 20 resting upon the ground 21. These tracks are supported upon ties 22 according to regular road bed construction. A cable 23 is arranged beneath all of the cars of the train and connects with the various solenoids 12 for providing the unitary operation. This cable terminates at the cabin of the engineer of the train and is provided with suitable switches for operation. As shown on the drawings one solenoid 12 is provided on each side of each wheel and for each solenoid an arm 16 and construction as shown in Fig. 6. The means for the supporting of each solenoid upon the truck is accomplished by a bracket 24 which is attached upon the truck and supports said solenoid.

In Fig. 4 the plunger of the solenoid is shown extended while in all of the other figures they are shown retracted. When extended the plunger is adapted to project into the path of motion of the offset portion 17 of the arm 16. When this arm is not moved outwards by centrifugal force, dot and dash lines 25 in Fig. 4 indicate the inward position of the offset end 17. As shown in full lines it is in its outward position. The adjustable mounting of the block 15 is accomplished by slidably mounting the block within a groove 26 in the wheel 14. A screw 27 is rotatively mounted on the wheel and threadedly engages the block so as to be manually rotatable for accomplishing the various adjustments. This screw is provided with a head at its outer end accessible for turning. The pivot of the arm 16 is accomplished by a pintle pin 28 supported upon the block 15. Stops 18 are formed on the wheel at both sides of the arm 16 to limit its motion and said stops are of such a length as not to engage with a plunger 13.

The resilient means for drawing said arm 16 inwards upon slowing down of the turning of the wheel consists of a spring 29 connected between the arm and the wheel. The centrifugal force produced by the rotating wheel causes the arm 16 to pivot to an outward position as shown in Figs. 3 and 6. The spring 29 must be so designed that when the speed of the train is reduced a sufficient amount so that the arm 16 may move so that its offset end 17 engages the plunger 13, the force has been sufficiently reduced that the wheel can be stopped without shearing of the pintle pin 28. When the wheel has stopped revolving, the spring 29 draws the arm 16 inwards and against the inner stop 18. It is necessary to use auxiliary brakes to slow down the speed of the train to such a speed that the magnetic brake can be used. This auxiliary brake may consist of a bracket 30 mounted upon the bottom of the truck 10 and supporting solenoids 31 provided with plungers 32 extendibly vertical to engage against the rails 20 and produce sufficient friction to slow down the train. The plungers 32 frictionally engage against the sides of the solenoids and are thereby prevented from falling into engagement with the rails 20 but energization of the solenoids 31 forces the plungers 32 downward into engagement with the rails.

In operation of the device, the train while running and upon intending to stop is first slowed down in speed by extension of the plungers 32 which act against the rails 20, and after the train has sufficiently slowed down the springs 29 are capable of drawing the arms 16 inwards against centrifugal force which held them outwards. Inward motion of the arms causes the offset ends 17 to be disposed in the path of the plunger 13. The engineer of the train energizes the solenoid 12 to keep their plungers in the extended position when he wishes the train to be brought to a stop. When the speed has been sufficiently reduced the plungers will engage the arms and stop the wheels.

The electric circuit is preferably closed by a double pole-double throw switch which is connected at one side to the motors of the train and at the other side to the solenoids so that when the latter are energized, the motor circuit is disconnected. This wiring is of the conventional type, and therefore is not illustrated.

The screws 27 may be rotated for changing the positions of the blocks 15 so that stresses on the pintle pins 28 may also be distributed upon one of the stops 18. This permits a setting of the device for withstanding stronger strains. The setting may be accomplished by rotating the screws so that when the arms 16 are in positions for engaging the plunger 13 the arms also rest against one of the stops and when the blow of stoppage occurs some of the force is transmitted or absorbed by the stop 18 in addition to the absorbing of such force by the pintle.

The adjustment of the block 15 is such that the arm 16 cannot come in contact with both the plunger 13 and the inner stop 18. As the rotation of the wheel slows down, the offset end 17 catches the plunger 13. The inclined edge of the offset end 17 immediately trys to pull the arm 16 against the plunger but this is impossible because the arm 16 comes in contact with the stop 18 and then cannot reach the plunger 13 because of the adjustment. It is clear that the force has been divided into two parts, a longitudinal and a transverse component. The longitudinal component is absorbed by the pintle 28 while the transverse component is absorbed by the inner stop 18.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In combination with a truck of a train, a solenoid supported on the truck and provided with a plunger extendible towards the side of a wheel on said truck, a block radially adjustable on said wheel, an arm pivoted at one end on said block and formed with an offset portion at the other end for engaging against said plunger when extended, stops on the wheel on opposite sides of said arm, resilient means for drawing said arm inwards upon slowing down or turning of said wheel which reduces centrifugal force so that said offset front end engages said extended plunger to stop said wheel, and said block being adjustable for positioning said arm so that all shock due to said stoppage is carried by the pintle of said arm or distributed between the pintle and one of said lugs.

2. In combination with a truck of a train a solenoid supported on the truck and provided with a plunger extendible towards the side of a wheel on said truck, a block radially adjustable on said wheel, an arm pivoted at one end on said block and formed with an offset portion at the other end for engaging against said plunger when extended, stops on the wheel on opposite sides of said arm, resilient means for drawing said arm inwards upon slowing down or turning of said wheel which reduces centrifugal force so that said offset front end engages said extended plunger to stop said wheel, and said block being adjustable for positioning said arm so that all shock due to said stoppage is carried by the pintle of said arm or distributed between the pintle and one of said lugs, the suspending of said solenoid being accomplished by a bracket attached upon the truck and supporting this solenoid.

3. In combination with a truck of a train a solenoid supported on the truck and provided with a plunger extendible towards the side of a wheel on said truck, a block radially adjustable on said wheel, an arm pivoted at one end on said block and formed with an offset portion at the other end for engaging against said plunger when extended, stops on the wheel on opposite sides of said arm, resilient means for drawing said arm inwards upon slowing down or turning of said wheel which reduces centrifugal force so that said offset front end engages said extended plunger to stop said wheel, and said block being adjustable for positioning said arm so that all shock due to said stoppage is carried by the pintle of said arm or distributed between the pintle and one of said lugs, said solenoid being so positioned that when its plunger is in the fully extended position it is disposed in the path of motion of said offset front end.

4. In combination with a truck of a train, a solenoid supported on the truck and provided with a plunger extendible towards the side of a wheel on said truck, a block radially adjustable on said wheel, an arm pivoted at one end on said block and formed with an offset portion at the other end for engaging against said plunger when extended, stops on the wheel on opposite sides of said arm, resilient means for drawing said arm inwards upon slowing down or turning of said wheel which reduces centrifugal force so that said offset front end engages said extended plunger to stop said wheel, and said block being adjustable for positioning said arm so that all shock due to said stoppage is carried by the pintle of said arm or distributed between the pintle and one of said lugs, the adjustable mounting of said block being accomplished by a screw rotatively mounted on said wheel and threadedly engaging said block.

5. In combination with a truck of a train, a solenoid supported on the truck and provided with a plunger extendible towards the side of a wheel on said truck, a block radially adjustable on said wheel, an arm pivoted at one end on said block and formed with an offset portion at the other end for engaging against said plunger when extended, stops on the wheel on opposite sides of said arm, resilient means for drawing said arm inwards upon slowing down or turning of said wheel which reduces centrifugal force so that said offset front end engages said extended plunger to stop said wheel, and said block being adjustable for positioning said arm so that all shock due to said stoppage is carried by the pintle of said arm or distributed between the pintle and one of said lugs, the adjustable mounting of said block being accomplished by a screw rotatively mounted on said wheel and threadedly engaging said block, said screw being provided with a head for manual rotation.

6. In combination with a truck for a train, a solenoid supported on the truck and provided with a plunger extendible towards the side of a wheel on said truck, a block radially adjustable on said wheel, an arm pivoted at one end on said block and formed with an offset portion at the other end for engaging against said plunger when extended, stops on the wheel on opposite sides of said arm, resilient means for drawing said arm inwards upon slowing down or turning of said wheel which reduces centrifugal force so that said offset front end engages said extended plunger to stop said wheel, and said block being adjustable for positioning said arm so that all shock due to said stoppage is carried by the pintle of said arm or distributed between the pintle and one of said lugs, said resilient means comprising a spring attached on the arm and on the wheel and of sufficient strength to hold the arm as desired.

7. In combination with a truck of a train, a solenoid supported on the truck and provided with a plunger extendible towards the side of a wheel on said truck, a block radially adjustable on said wheel, an arm pivoted at one end on said block and formed with an offset portion at the other end for engaging against said plunger when extended, stops on the wheel on opposite sides of said arm, resilient means for drawing said arm inwards upon slowing down or turning of said wheel which reduces centrifugal force so that said offset front end engages said extended plunger to stop said wheel, and said block being adjustable for positioning said arm so that all shock due to said stoppage is carried by the pintle of said arm or distributed between the pintle and one of said lugs, the adjustable mounting of said block being accomplished by a screw rotatively mounted on said wheel and threadedly engaging said block, said screw being provided with a head for manual rotation, said screw being of sufficient length so that the block may assume a position with the arm resting against one of said stops so that when the stoppage blow occurs stresses are communicated to the stop in addition to the pintle supporting said arm.

In testimony whereof I have affixed my signature.

JOSEPH MOSLEH.